(12) United States Patent
Gebhard et al.

(10) Patent No.: US 7,638,970 B1
(45) Date of Patent: Dec. 29, 2009

(54) SEARCH LIGHT WITH REMOTE CHARGER

(75) Inventors: Albert W. Gebhard, Devner, CO (US); Gerald L. Gohl, McCook, NE (US)

(73) Assignee: Golight, Inc., Culbertson, NE (US)

( * ) Notice: Subject to any disclaimer, the term of this patent is extended or adjusted under 35 U.S.C. 154(b) by 327 days.

(21) Appl. No.: 11/617,205

(22) Filed: Dec. 28, 2006

Related U.S. Application Data

(63) Continuation-in-part of application No. 29/247,104, filed on May 31, 2006, now Pat. No. Des. 556,353.

(51) Int. Cl.
*H02J 7/00* (2006.01)
*F21L 4/02* (2006.01)

(52) U.S. Cl. .................. 320/113; 320/107; 362/183

(58) Field of Classification Search .............. 320/106, 320/107, 109, 110, 111, 112, 113, 114, 115, 320/137, 162; 361/669, 670, 671; 439/500, 439/504, 511, 522, 626, 627; 362/157, 158, 362/159, 183, 192, 193, 200, 208; D26/37, D26/38, 41, 44, 46, 48, 50, 51, 52, 63; 710/303; 703/303, 304; D14/434
See application file for complete search history.

(56) References Cited

U.S. PATENT DOCUMENTS

| | | | |
|---|---|---|---|
| 4,345,304 A | 8/1982 | Penney et al. | |
| 4,463,283 A | 7/1984 | Penney et al. | |
| 4,605,993 A | 8/1986 | Zelina, Jr. | |
| 4,903,178 A | 2/1990 | Englot et al. | |
| 5,019,951 A | 5/1991 | Osterhout et al. | |
| 5,165,048 A | 11/1992 | Keller et al. | |
| 5,432,689 A | 7/1995 | Sharrah et al. | |
| 5,673,989 A | 10/1997 | Gohl et al. | |
| 5,689,171 A | 11/1997 | Ludewig | |
| 5,780,991 A * | 7/1998 | Brake et al. ............... | 320/112 |
| 5,791,763 A | 8/1998 | Kam-Hoi | |
| 5,908,233 A | 6/1999 | Heskett | |
| 5,988,828 A | 11/1999 | Prince et al. | |
| 6,005,368 A * | 12/1999 | Frame ...................... | 320/113 |
| 6,124,699 A | 9/2000 | Suzuki et al. | |
| 6,127,802 A | 10/2000 | Lloyd et al. | |
| 6,186,641 B1 | 2/2001 | Parker | |
| RE37,092 E | 3/2001 | Sharrah et al. | |
| 6,350,040 B1 | 2/2002 | Parker | |
| 6,659,621 B2 | 12/2003 | Sharrah et al. | |

(Continued)

FOREIGN PATENT DOCUMENTS

EP 0896414 2/1999

(Continued)

*Primary Examiner*—Edward Tso
*Assistant Examiner*—M'Baye Diao
(74) *Attorney, Agent, or Firm*—Margaret Polson; Oppedahl Patent Law Firm LLC

(57) ABSTRACT

A battery charging station having a main docking station to recharge the battery while the battery is installed in a electrical device and a second charging station that can be removed from the main base is disclosed. The removable charging station allows a user to charge a battery not in use at a remote location from the docking station. If the second charging station is attached to the docking station, the battery in the removable charging station is charged after the battery installed in the light is charged.

12 Claims, 6 Drawing Sheets

U.S. PATENT DOCUMENTS

| | | |
|---|---|---|
| 6,752,514 B2 | 6/2004 | Parker |
| 6,805,461 B2 | 10/2004 | Witte |
| 6,897,785 B2 | 5/2005 | Corbus |
| 6,902,293 B2 | 6/2005 | Tang |
| 6,937,468 B2 | 8/2005 | Lin et al. |
| 6,951,480 B2 | 10/2005 | Rivera |
| 6,966,669 B2 * | 11/2005 | Hussaini et al. ............. 362/183 |
| 2003/0081412 A1 | 5/2003 | Sharrah |
| 2004/0251873 A1 * | 12/2004 | Simoes et al. ............... 320/114 |
| 2005/0251228 A1 * | 11/2005 | Hamel ........................ 607/60 |

FOREIGN PATENT DOCUMENTS

WO    WO2005060715    7/2005

* cited by examiner

SEARCH LIGHT WITH REMOTE CHARGER

CROSS REFERENCE APPLICATIONS

This application is a continuation in part of application Ser. No. 29/247,104 filed May 31, 2006.

BACKGROUND

Battery powered search lights are well known in the art. The problems associated with ensuring that a charged battery is available are also well known the art. Current prior art lights often have charging stations that allow the battery to be charged while in the light and some have a second slot to allow the user to charge a spare battery.

The foregoing example of the related art and limitations related therewith are intended to be illustrative and not exclusive. Other limitations of the related art will become apparent to those of skill in the art upon a reading of the specification and a study of the drawings.

SUMMARY

An aspect of the present device is to provide for a battery charging station that can be located at a remote location from the main charging station.

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

The present device has a battery charger that can be removed from the main base, allowing a user to charge a battery not in use at a remote location from the main base. If the battery charger is attached to the main base, the battery is charged after the battery installed in the light is charged.

In addition to the exemplary aspects and embodiments described above, further aspects and embodiments will become apparent by reference to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION OF THE DRAWINGS

Figure 1:
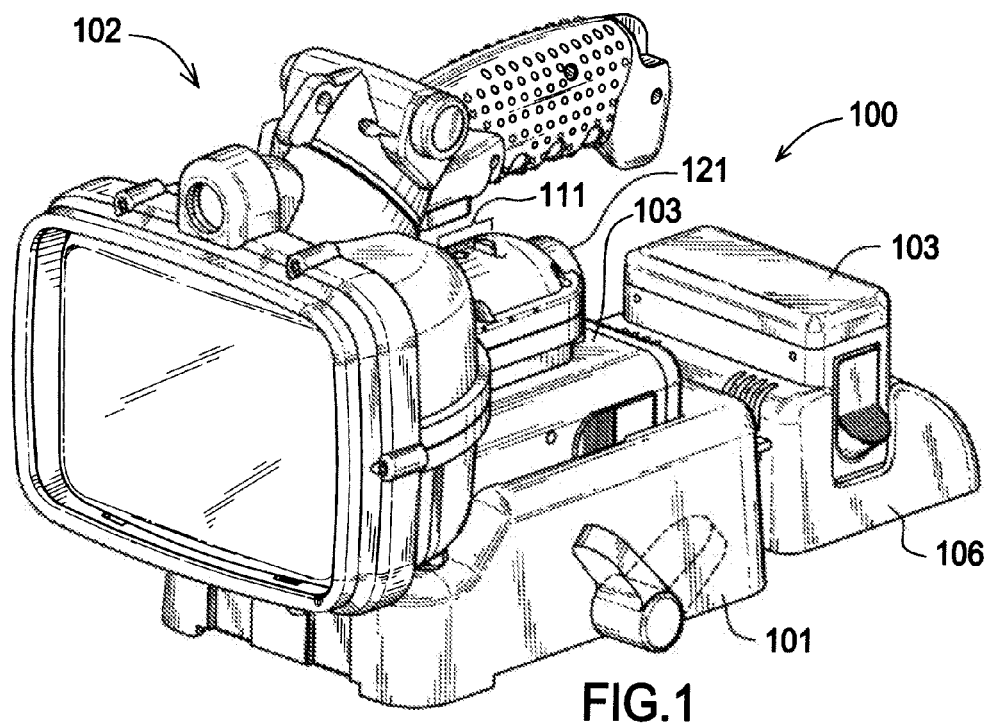
FIG. 1 is a side perspective view of the device with the charging stations attached to each other with the motion of the release lever shown in dotted lines.
Figure 2:
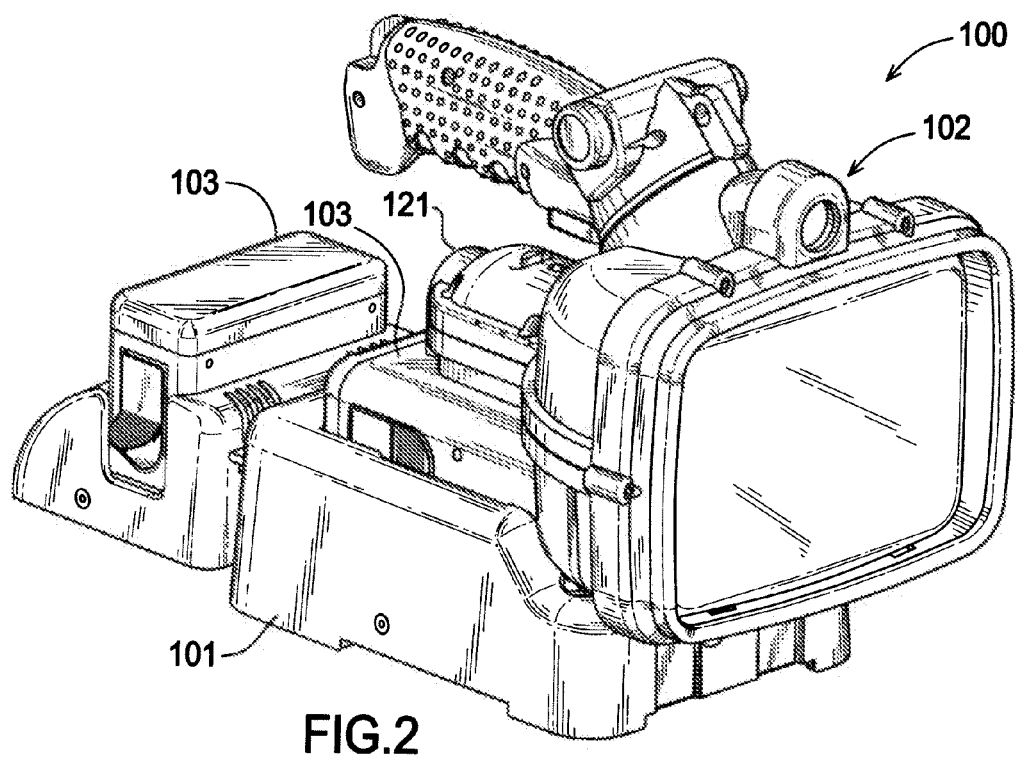
FIG. 2 is a side perspective view of the device with the charging stations attached to each other.

Referring first to FIG. 1, the unit 100 has a light docking station 101 with a charging location 104 that is adapted to fit a search light 102 with a removable, rechargeable battery 103. The rechargeable battery 103 can be located on the search light such that the battery is near the body of the light that contacts the docking station 101.

Electrically connected to one side of the light docking station 101 is a remote charging station 106 for a second rechargeable battery 103. Both the docking station 101 and the remote charging station 106 have charging circuits to charge a battery and control circuitry, as will be discussed below.

The disclosed embodiment is shown and discussed in terms of a search light with a rechargeable battery. It is to be understood that the device is not limited to a search light, any hand held electrical device that is powered by rechargeable batteries could use a docking station and remote charging station as disclosed.

Search light 102 can be locked down into charging location 104 and can be released via release lever 105. The lock (not shown) is spring loaded to automatically lock into place when the light 102 is placed in the charging location 104 to prevent the light 102 from falling out of the light docking stations 101. This allows the light docking station 101 to be mounted in a motor vehicle or other moving location and have the light 102 remain in the light docking station 101 while the vehicle is in motion. The lock also ensures a good contact with the contact plates 107 in the charging location 104 with electrical contacts in the base of the search light 102 to allow current flow during charging. The contact plates 107 are electrically connected to the charging circuit such that when the contacts of the light connect to the contact plates 107 of the charging location a complete circuit is formed.

Figure 3:
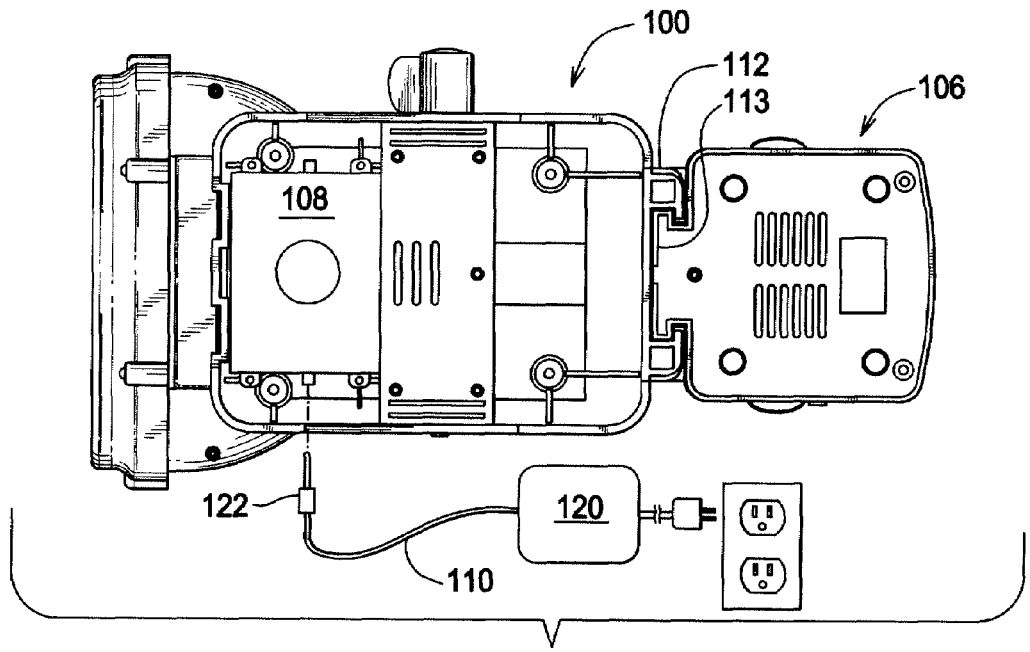
FIG. 3 is a bottom plan view of the device with the charging stations attached to each other.
Figure 4:
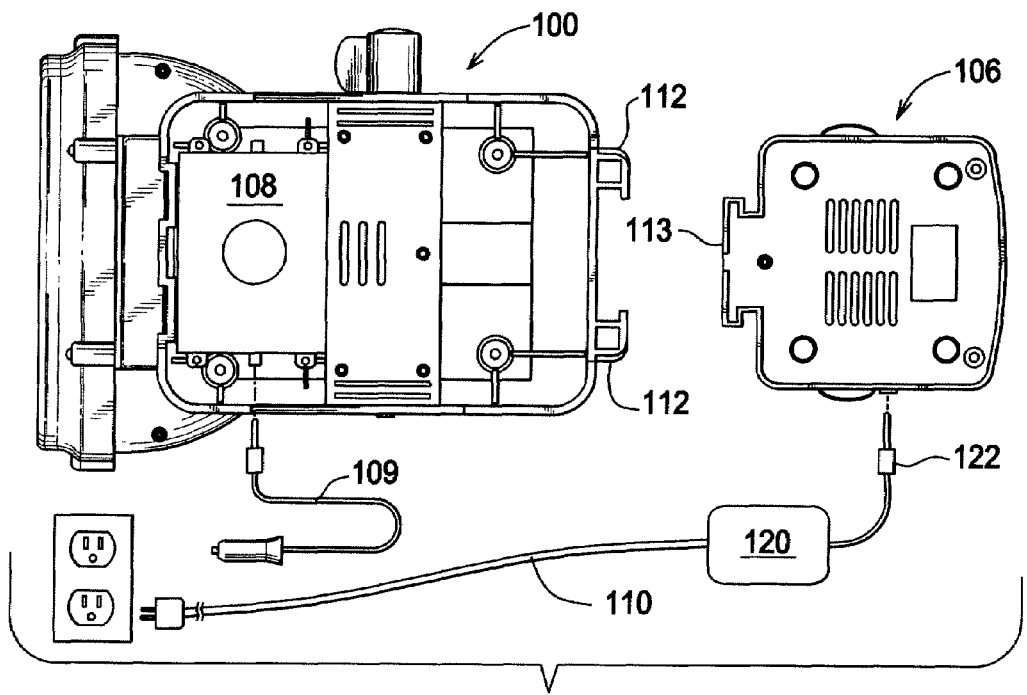
FIG. 4 is a bottom plan view of the device with the charging stations separated.
Figure 5:
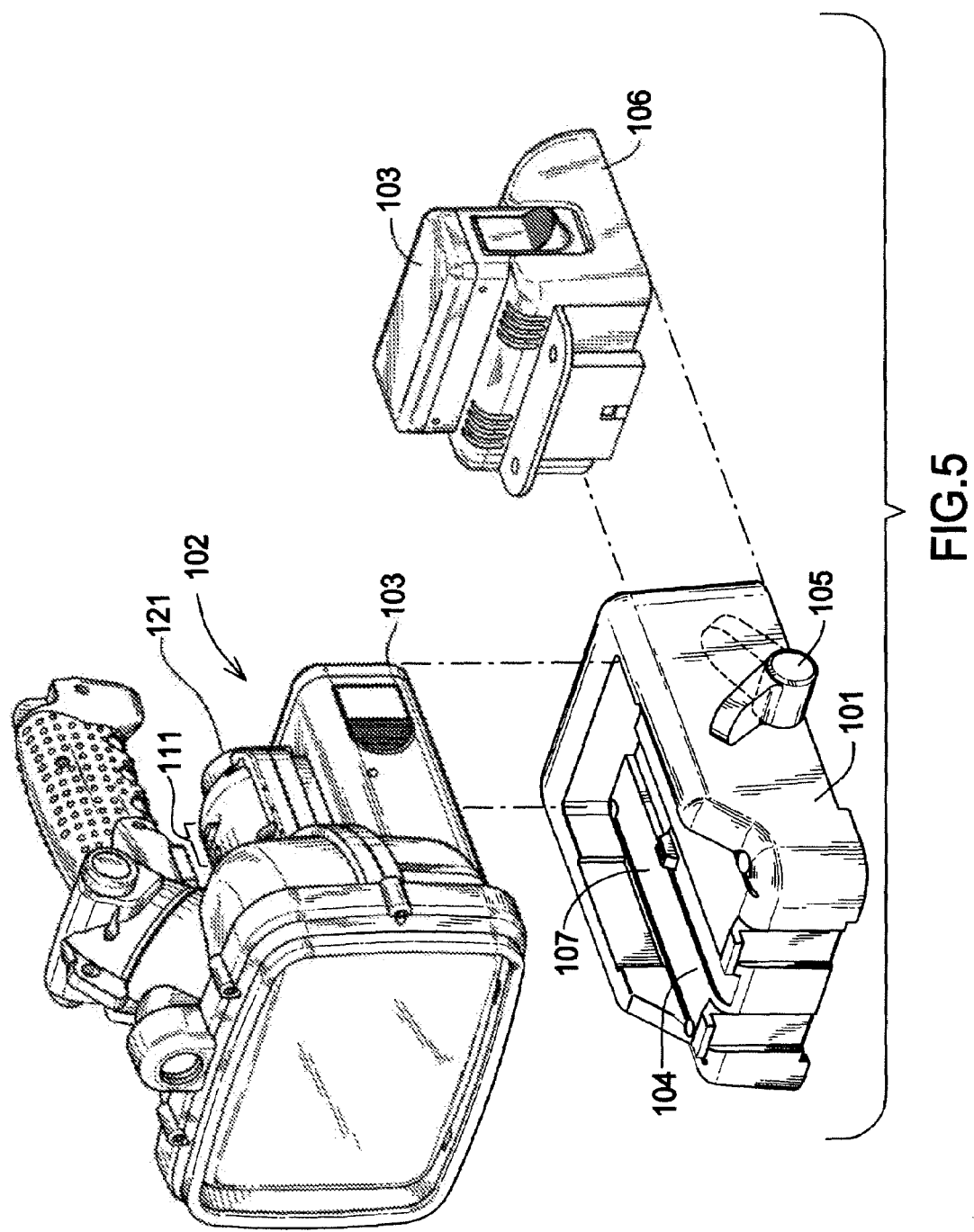
FIG. 5 is an exploded view of the device.

Power is provided to light docking station 101 and remote charger 106 by power cords 109, 110 as seen in FIGS. 3 and 4. Power converter 120 is a standard converter available in two models (120vAC or 220vAC) and will take wall receptacle input of either 120v or 220v respectively and provide a DC power output of 12vDC.

Search light 102 can also be charged as a standalone unit, that is when not connected to docking station 101. In such an instance, an 18vDC a female plug 121 (not directly visible) located at the rear of search light 102 will take male 18vDC plug 122 which is the output plug of power converter 120. Indicator lights 111 can be provided to indicate the charging status of batteries and/or if the search light 102 is turn on.

Thus, the battery in search light 102 can be charged directly through power converter 120 or through docking station 101. In the disclosed embodiment in FIG. 4, power coming into the docking station 101 via power cord 109 is converted from 12 volt DC to 18 volt DC power via converter 108. This cord can be hard wired into the side of docking station 101 or be plugged in. Alternatively, power cord 110 can be connected to and standard 110-120 V sources, or a 220 V converter can be used.

The light docking stations 101 is connected to battery charging station 106 via interlocking connector pieces 112 and 113. In the depicted embodiment, the connector pieces are a bayonet type lock. Other known in the art connector systems could be used as well. The connector pieces must provide a snug fit to allow contact points (not shown) to electrically connect the battery charging station 106 to the light docking station 101. Alternatively, a plug connection could be provided such that the user would manually plug the battery charging station 106 into a receptacle on light docking station, or vice versa. In one embodiment, the power connection point is located on connector piece 113, such that the power connect point is blocked when the battery charging stations 106 is attached to the docking station 101. This prevents two power cords being plugged into the joined unit to reduce the complexity of the circuitry.

Battery charging station 106 is charged by power cord 110 when not electrically connected to the docking station, as seen in FIG. 4. Battery charging station 106 also has a power converter 108. Other voltages or current types for both input and charging voltage or current can be varied depending on application and location.

Figure 6:
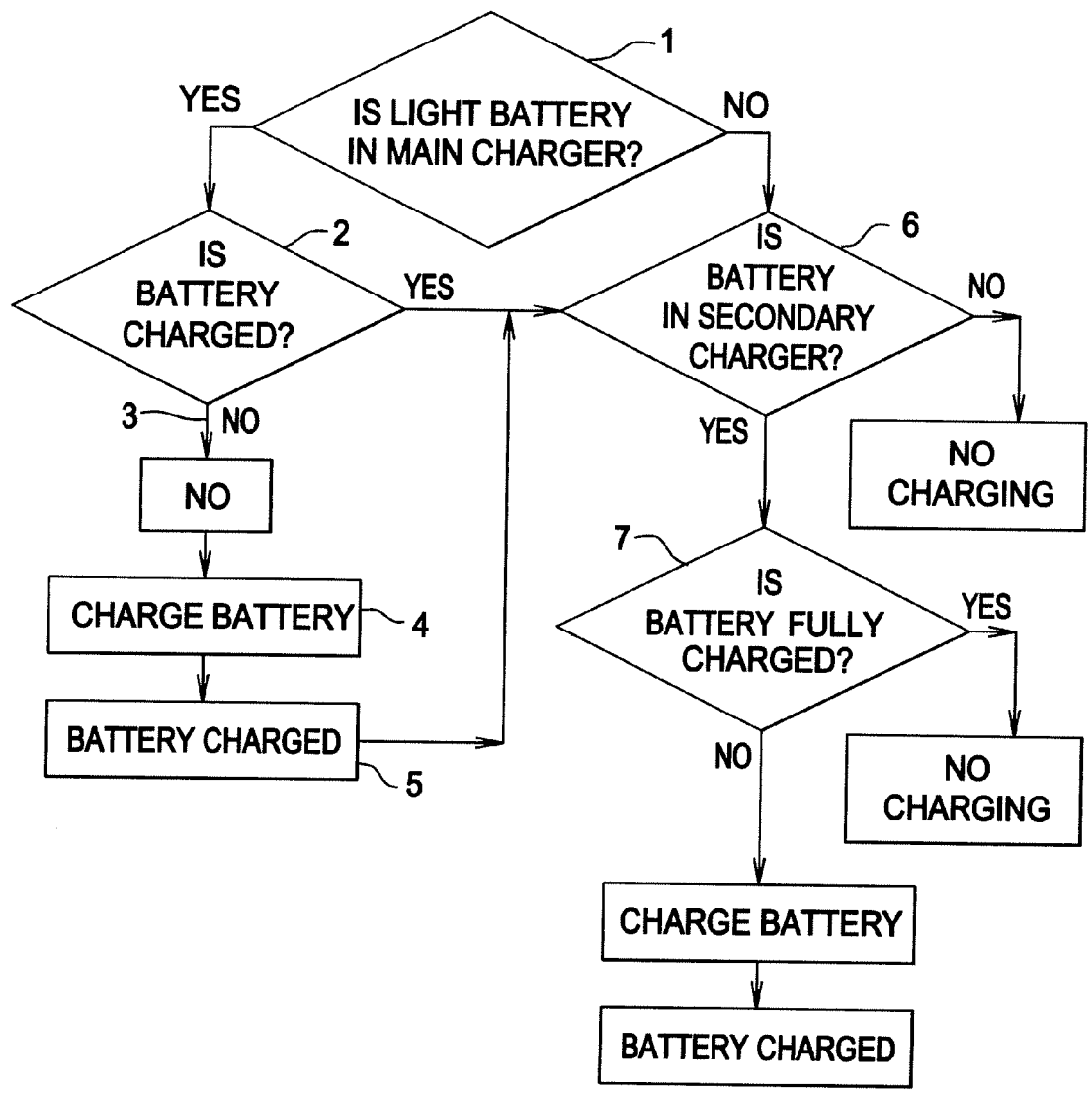
FIG. 6 is a flow chart of the control logic of the depicted embodiment.

FIG. 6 is a flow diagram of the control circuitry of the unit 100. If the circuitry senses a light 102 with a battery 103 in the light docking station 101 (block 1), a sensor checks to see if the battery 103 installed in the light 102 is charged (block 2. If the battery 103 is not charged (line 3), power is directed to the main charging circuit in light charging station 101 to charge the battery 103 (block 4) installed in the light 102. Once the sensor detects that battery 103 in the light 102 is charged (block 5), the sensor checks to see if there is a battery 103 in the remote charger 106 that needs charging (block 6). If the battery 103 in the remote charging station needs charging (block 7) and the battery in the main charging unit is charged or not present, the battery in the remote charging unit is charged using secondary charging circuit.

If desired, additional control circuitry and controls can be provided that would allow the user to select which battery was charged first.

If the remote charger 106 is removed from the light docking station and plugged into a power source a battery 103 placed in the remote charging station 106 is immediately charged. So, if a user wished to charge both batteries 103 as quickly as possible, the charging units should be separated from each other electrically, and plugged in separately. Another option is to have two remote charging stations 106, one plugged into the docking station and another kept at a remote location requiring only a DC wall converter 110. This could be convenient for someone having one additional battery.

There are three basic circuits in addition to a simple wall converter (AC/DC) that provides a 12VDC output (ref. 110 in FIGS. 3, 4). A simple 12VDC to 18VDC power converter 108 (ref. FIGS. 3, 4), circuit not shown, is located underneath light docking station 101. It receives a 12VDC input and converts it to a 18VDC output. Remote charging station 106 has a control circuit that will be discussed below in FIG. 8. Search light 102 contains a control circuit for all switching which will be discussed below in FIG. 7.

Figure 7:
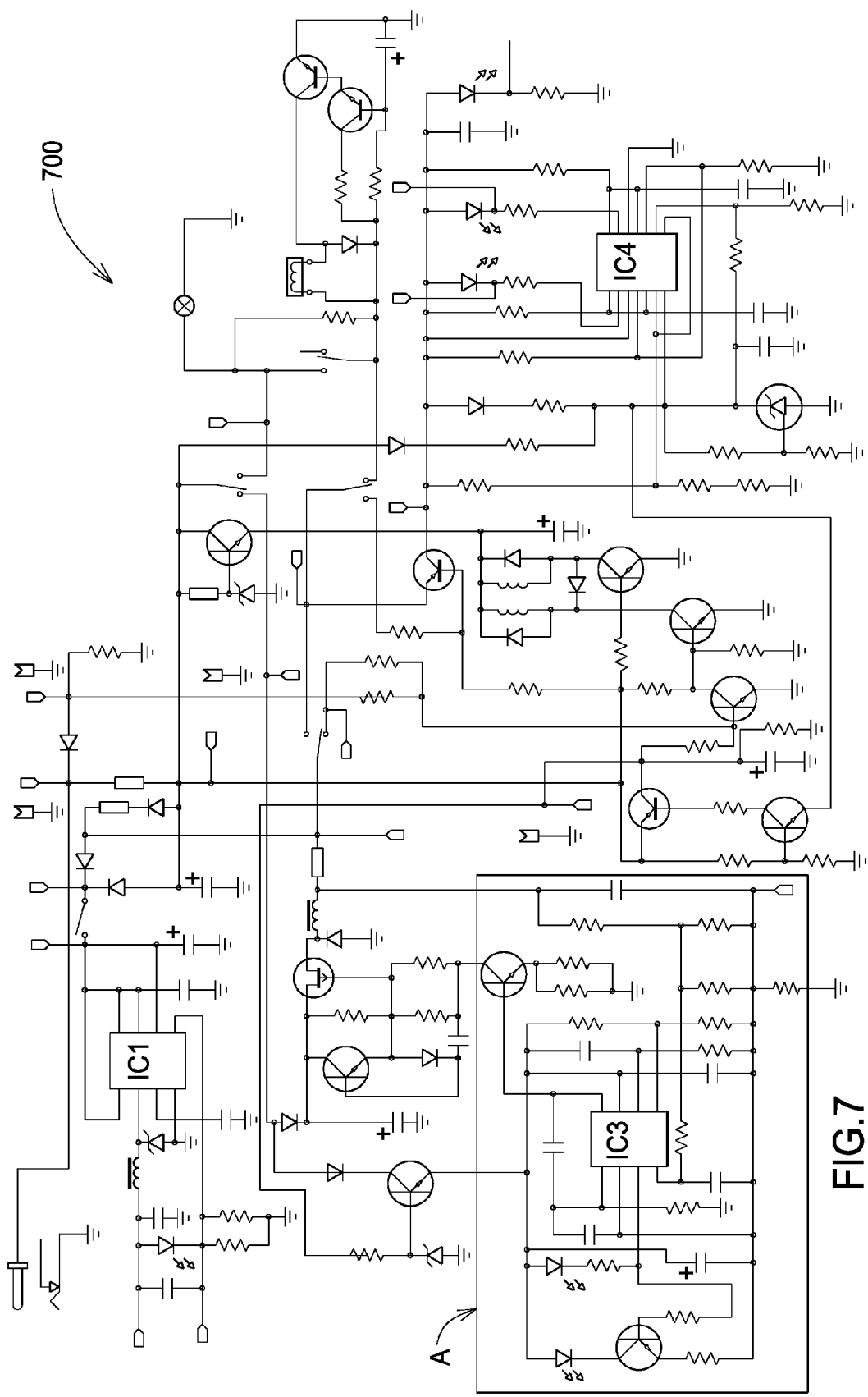
FIG. 7 is a circuit schematic for the primary charge control function as discussed in the flow chart of FIG. 6.

FIG. 7 is a schematic for the primary charge control circuit 700 with the function as discussed in the aforementioned flow chart of FIG. 6. Primary charge control circuit 700 shown is one embodiment of the control circuit and is shown by way of example and not of limitation. Primary charge control circuit 700 includes control circuit A. One skilled in the art could design numerous circuits to perform the same control function. Primary charge control circuit 700 is multi-functioned and controls all switching functions while providing charge priority control as discussed in FIG. 6. It receives the primary 18VDC input from power converter 108 and contains the on/off switch for powering search light 102. It recognizes which battery 103 is charged and provides priority to charging the main light battery versus the secondary charger battery, if present. It provides 18VDC power to the remote charge control circuit of FIG. 8 below.

Figure 8:
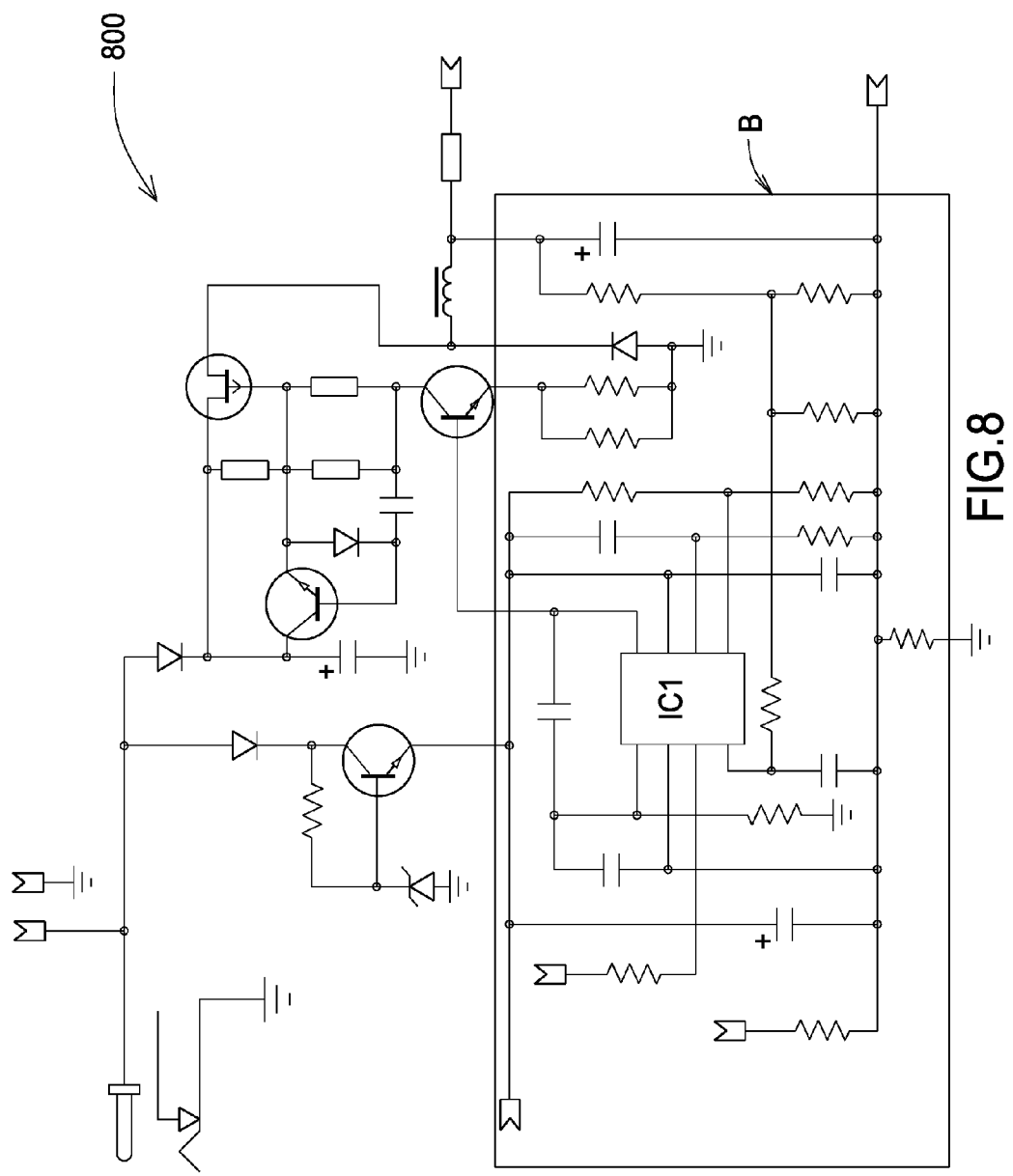
FIG. 8 is a circuit schematic for the remote charging control.

FIG. 8 is a schematic for the remote charging control circuit 800 located within remote charging station 106 (ref. FIGS. 1, 3, 4, 5). Primary charge control circuit 700 detects the presence of a remote battery within remote charging station 106. If the primary battery is charged and the remote battery is detected as not charged, then remote charging primary charge control circuit 700 will provide 18VDC power to remote charging control circuit 800, which includes control circuit B, until the remote battery is fully charged. Remote charging control circuit 800 performs charge control of the remote battery. It should be noted that anyone skilled in the art could design numerous circuits to perform the same control function.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations are within their true sprit and scope. Each apparatus embodiment described herein has numerous equivalents.

We claim:

1. A charging station for batteries comprising:
   a docking station for an electrical device powered by a battery, said electrical device having a first battery installed therein and contact points electrically connected to the battery;
   the docking station having a power source and a charging location;
   the charging location having a charging circuit and contact points electrically connected to the charging circuit;
   the charging location configured to receive the electrical device and first battery such that the contact point of the electrical device and the contact points of the charging location are in electrical contact, forming a complete circuit functioning to recharge the first battery;
   a battery charging station configured to be removably attached to the docking station;
   the battery charging station having a charging circuit and a slot to receive a second battery;
   the slot being configured such that when the second battery is seated in the slot, the second battery is electrically connected to the battery charging station and the charging circuit, allowing the battery to be charged;
   the battery charging station capable of being attached to the docking station in electrical connection to the docking station providing electrical power to charge the battery; and
   the battery charging station capable of being connected to an alternative power source to charge the battery.

2. The charging station for batteries of claim 1 further comprising at least one power converter to convert at least one of the voltage or current.

3. The charging station for batteries of claim 1 further comprising at least one sensor to detect if a battery requires charging when said battery is electrically connected to the charging station.

4. The charging station for batteries of claim 3, further comprising a control circuit attached to the first sensor, the control circuit functioning to cause the charging circuit to charge the first battery when the sensor detects the first battery is not fully charged and to discontinue charging once the first battery is fully charged.

5. The charging station for batteries of claim 4 further comprising a second sensor in the battery charging station to detect if the second battery is charged and the control circuit controlling which battery is charged first if both batteries are not fully charged.

6. The charging station for batteries of claim 5 wherein the first battery is charged first.

7. The charging station of claim 1 wherein the electrical device is a searchlight.

8. A battery operated search light and charging system comprising:

the search light being powered by a removable and rechargeable first battery installed therein and contact points electrically connected to the battery;

a docking station for the search light, the docking station having a power source and a control circuit;

a charging circuit having contact points, said charging circuit electrically connected to the control circuit;

the docking station configured to receive the search light with the battery installed such that the contact point of the electrical device and the contact points of the control circuit are in electrical contact, forming a complete circuit functioning to recharge the battery; a battery charging station configured to be removably attached to the docking station; the battery charging station having a slot to receive a second battery;

the slot being configured such that when the second battery is seated in the slot the battery is electrically connected to the battery charging station, allowing the second battery to be charged;

the battery charging station having a connection mode in electrical connection to the docking station to provide electrical power to charge the second battery; and the battery charging station having a stand alone mode when connected to an alternative power source and when not connected to the docking station.

9. The battery operated search light and charging system of claim 8 further comprising at least one power converter to convert at least one of the voltage or current.

10. The battery operated search light and charging system of claim 8 further comprising at least one sensor to detect if a battery requires charging when said battery is electrically connected to the charging station.

11. The battery operated search light and charging system of claim 10, further comprising a first sensor attached to the control circuit, the control circuit functioning to cause the charging circuit to charge the first battery when the sensor detects the first battery is not fully charged and to discontinue charging once the first battery is fully charged.

12. The charging station for batteries of claim 11 further comprising a second sensor in the battery charging station to detect if the second battery is charged and the control circuit controlling which battery is charged first if both batteries are not fully charged.

* * * * *

UNITED STATES PATENT AND TRADEMARK OFFICE
CERTIFICATE OF CORRECTION

PATENT NO.       : 7,638,970 B1                              Page 1 of 1
APPLICATION NO.  : 11/617205
DATED            : December 29, 2009
INVENTOR(S)      : Gebhard et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 328 days.

Signed and Sealed this

Ninth Day of November, 2010

David J. Kappos
*Director of the United States Patent and Trademark Office*